Dec. 9, 1930.  L. E. WILLIAMS  1,784,263
TRAILER STEERING DEVICE
Filed Jan. 3, 1927
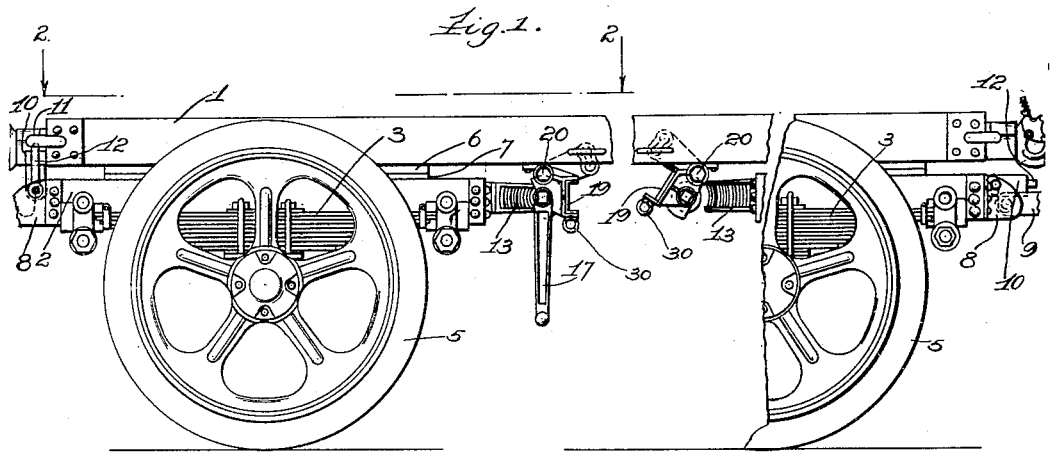
Fig. 1.
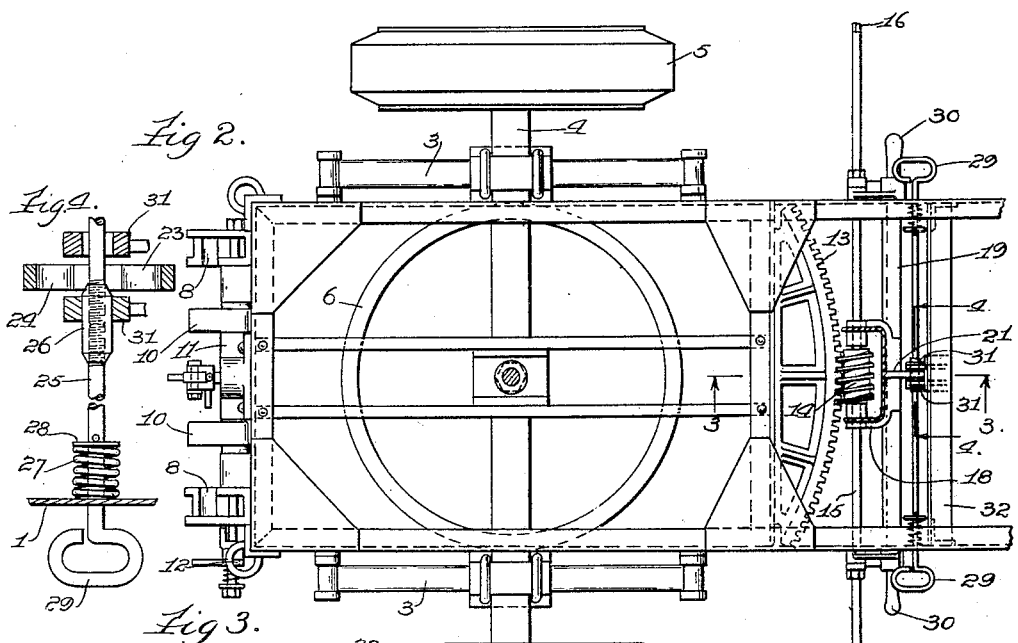
Fig. 2.
Fig. 4.
Fig. 3.
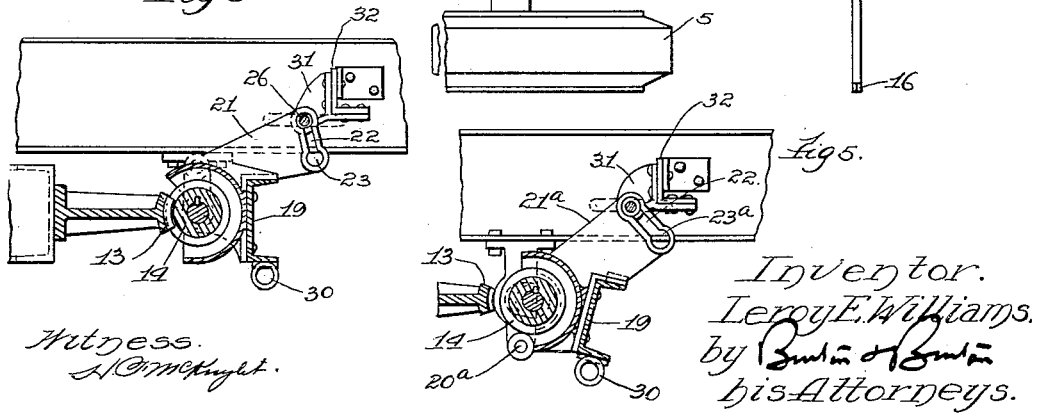
Fig. 5.
Inventor.
Leroy E. Williams.
by Burton & Burton
his Attorneys.

Patented Dec. 9, 1930

1,784,263

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

TRAILER-STEERING DEVICE

Application filed January 3, 1927. Serial No. 158,505.

This invention relates to trailer vehicles of the type in which the rear wheels are dirigibly mounted so that in backing the trailer in close quarters it is possible to effect the steering, in part at least, by manipulation of these rear wheels; and the object of the invention is to provide safe and positive steering connections for this purpose. It consists in certain features and elements of construction in combination, as herein shown and described and as indicated by the claims.

In the drawings:

Figure 1 is a somewhat fragmentary side elevation of a trailer fitted with steering connections embodying this invention.

Figure 2 is a top plan view showing one end of the trailer and its steering connections.

Figure 3 is a detail section taken as indicated at the line, 3—3, on Figure 2.

Figure 4 is a detail section taken as indicated at line, 4—4, on Figure 2.

Figure 5 is a section similar to Figure 3, showing a slightly modified form of the invention.

In using a trailer having dirigible rear wheels, it is frequently necessary to back the vehicle into a door-way or through a narrow alley, and for accurate steering it is desirable to adjust the dirigible rear wheels while the vehicle is moving. Heretofore it has been customary to insert a short tongue or bar into the usual coupling fitting at the rear of the vehicle so that a man standing directly behind the trailer may manipulate the wheels, but this involves considerable hazard in that the truck driver cannot see the man at the rear of the trailer so that if he should stumble, he might fall under the trailer wheels or he might be caught between the rear end of the trailer and a building wall or be thrown to one side if one wheel of the trailer should strike an obstacle or obstruction so as to suddenly swing the tongue or steering bar forcibly to one side. The present invention provides steering means accessible at the side of the trailer so that the man operating it is in sight of the truck driver and is not in a position of danger to himself. For purposes of illustration the trailer chassis shown in the drawings is similar to that of Patent No. 1,611,889, issued December 28, 1926, to Charles G. Clement, and consists of a main frame, 1, having swiveled sub-frames, 2, at each end to which the vehicle springs, 3, are shackled in association with the usual axles, 4, and wheels, 5. The swivel connection is of the fifth wheel type comprising an upper ring, 6, secured to the frame, 1, and a lower ring, 7, attached to the sub-frame, 2, in a well understood manner.

At the outer end the sub-frame, 2, carries fittings having upwardly-open sockets, 8, to receive connecting elements of a draw-bar, 9, as more specifically described in said Clement Patent No. 1,611,889. When in use the draw-bar, 9, is retained in the sockets, 8, by locking arms, 10, and when the draw-bar is removed, the arms, 10, are swung upwardly as shown at the left-hand end of the trailer in Figure 1 to engage the sides of a block, 11, secured to the main frame, 1, of the vehicle. This holds the swivel sub-frame normally against turning movement so that its wheels may serve as the rear wheels of the vehicle while the truck at the forward end is left free to swivel under control of the draw-bar, 9, shown in position at the right-hand end of Figure 1. However, when it is desired to back the trailer and utilize the steering movement of the rear wheels, the locking arms, 10, may be swung down out of engagement with the block, 11, as shown in Figure 2, by operating the handle, 12, which is provided on the rock shaft which carries the arms, 10.

Steering adjustment of the sub-frame, 2, and the wheels, 5, connected to it, is now secured through the agency of a toothed segment, 13, attached to the forward side of the sub-frame, 2, and adapted to mesh with an operating worm, 14, on a transverse shaft, 15, whose squared end, 16, is designed to receive an operating hand crank, 17. The shaft, 15, is journaled in a yoke, 18, with the worm, 14, positioned between the arms of the yoke, and said yoke is secured to a bar, 19, extending across the vehicle under the frame, 1. The yoke and its bar, 19, are hinged to the under side of the vehicle at 20, and the yoke is formed with an arm, 21, having a slot, 22, to permit a limited swing of the yoke about its hinge pivot, 20, sufficient for engaging and disengaging the worm, 14, and the teeth of the gear segment, 13. The slot, 22, terminates in enlargements, 23 and 24, and embraces a rod, 25, carrying an enlarged middle portion, 26, which is too large to pass through the middle portion of the slot, 22, but will enter either of the enlargements, 23 and 24. By means of springs, 27, reacting between the side bars of the frame, 1, and suitable collars, 28, the rod, 25, is normally held in position in which its enlargement, 26, occupies the same vertical plane as the slotted arm, 21, so that when the arm is swung to its upper limit of adjustment the enlargement, 26, will engage the opening, 23, and retain the parts in that position. When it is desired to shift the worm, 14, the rod, 25, is moved laterally by means of one or the other of the hand loops, 29, formed at its ends, and the enlargement, 26, is thus withdrawn from the opening, 23, permitting the narrower portion of the slot, 22, to swing over the more slender part of the rod, 25. With the arrangement shown in Figure 3 this will permit the worm, 14, to swing into and mesh with the segment, 13, whereupon the spring, 27, will force the enlargement, 26, into the opening, 24, and retain the worm gearing in mesh. For swinging the yoke, 18, the cross bar, 19, is fitted with handles, 30, accessible at the side of the trailer near the hand loops, 29, so that the operator may use one hand to release the locking member, 26, and then may swing the yoke, 18, with the other hand for engaging or disengaging the worm and its gear.

With the worm gear, 14, locked in mesh with the segment, 13, the hand crank, 17, may be used to turn the wheels, 5, as desired, for steering the trailer in the backing movement, or in any other maneuvering of the vehicle. When this is completed and the trailer is to travel forward in the normal manner, the hand crank, 17, will be used to adjust the sub-frame, 2, into its central straight-ahead position, and the locking arms, 10, will then be thrust up to engage the block, 11, for holding the parts so adjusted. The worm, 14, can be left in mesh, if desired, but when this end of the vehicle becomes the forward end with the draw-bar mounted in the sockets, 8, and with the locking arms, 10, swung downwardly out of engagement with the block, 11, the segment, 13, must be freed from the worm, 14, to permit proper steering movement of the wheels, 5, and this will be done simply by withdrawing the locking bar, 25, and swinging the yoke, 18, away from the segment, 13, by the amount permitted by the slot, 22, and then allowing the enlargement, 26, to enter the opening, 23, at the end of the slot for holding the worm out of mesh. This position of the parts is illustrated in the right-hand portion of Figure 1, while the left-hand portion shows the worm, 14, in meshed position with the hand crank, 17, ready for use.

When it is desired to leave the wheels, 5, free for steering movement as controlled by a draw-bar, it may be thought safer to arrange the worm, 14, so that it cannot possibly drop into mesh, even if the locking member, 26, should be momentarily released by vibration or otherwise from the enlargement of the slot, 22. Figure 5 shows a modification in which the pivot, 20ª, on which the yoke, 18 and its bar, 19, are hinged, is located below the parts so that their weight tends to swing them away from the segment, 13, with the locking member, 26, engaging an enlargement in the upper end of the slot 22. Gravity will thus operate to hold the worm out of mesh independently of the locking device, while for placing the worm, 14, in operative position it is merely necessary to swing the parts toward the segment, 13, moving the slot, 22, upwardly until its enlargement, 23ª, registers for engagement with the locking member, 26, on the rod, 25.

I claim:—

1. In a trailer vehicle comprising a main frame, a sub-frame swivelly connected thereto, and wheels on the sub-frame adapted for steering movement by virtue of such swivel connection, manually operable steering connections accessible for manipulation at the side of the vehicle, comprising a gear segment attached to the sub-frame, a shaft extending transversely on the main frame with a worm adapted to mesh with said segment, said shaft being mounted for movement on the main frame toward and from the sub-frame to carry the worm into or out of engagement with the segment.

2. In a trailer vehicle comprising a main frame, a sub-frame swivelly connected thereto, and wheels on the sub-frame adapted for steering movement by virtue of such swivel connection, manually operable steering connections accessible for manipulation at the side of the vehicle, comprising a gear segment attached to the sub-frame, a shaft extending transversely on the main frame with a worm adapted to mesh with said segment, a journal bearing for said shaft pivotally attached to the main frame at a distance from the shaft axis, whereby said bearing may be swung to move the worm into or out of engagement with the segment.

3. In a trailer vehicle comprising a main frame, a sub-frame swivelly connected thereto, and wheels on the sub-frame adapted for steering movement by virtue of such swivel connection, manually operable steering connections accessible for manipulation at the side of the vehicle, comprising a gear segment attached to the sub-frame, a shaft extending transversely on the main frame with a worm adapted to mesh with said segment, a bearing yoke for the shaft hinged to the frame at a distance from the shaft axis to permit swinging the worm into and out of engagement with the segment, together with a rigid arm associated with said yoke, and locking means carried by the frame engageable with said arm at either limit of swing about the hinge for holding the parts positively in adjusted position.

4. In a trailer vehicle comprising a main frame, a sub-frame swivelly connected thereto, and wheels on the sub-frame adapted for steering movement by virtue of such swivel connection, manually operable steering connections accessible for manipulation at the side of the vehicle, comprising a gear segment attached to the sub-frame, a shaft extending transversely on the main frame with a worm adapted to mesh with said segment, a bearing yoke for the shaft hinged to the frame at a distance from the shaft axis, a slotted arm associated with said yoke, its slot having enlarged portions at the ends, a rod slidable transversely in the frame and accessible at the side of the frame, said rod passing through the slot and having a part which is too large to enter said slot except at its enlarged end portions, whereby said part serves to lock the yoke at one or the other of its limits of swing.

5. In a trailer vehicle comprising a main frame, a subframe swivelly connected thereto, and wheels on the subframe adapted for steering movement by virtue of such swivel connection, manually operable steering connections accessible for manipulation at the side of the vehicle comprising a gear segment rigidly attached to the subframe, a shaft extending transversely on the main frame with a worm adapted to mesh with said segment, a handle device provided for either end of the shaft at the outside of the frame, a bearing yoke for the shaft hinged to the frame at a distance from the shaft axis to permit swinging the worm into and out of engagement with the segment, said yoke normally tending to swing downwardly by gravity about said hinge connection for carrying the worm out of engagement with the segment, an arm associated with said yoke, and locking means carried by the frame engageable with said arm at either limit of swing about the hinge for holding the parts positively in adjusted position.

6. In a trailer vehicle comprising a main frame, a subframe swivelly connected thereto, and wheels on the subframe adapted for steering movement by virtue of such swivel connection, manually operable steering connections accessible for manipulation at the side of the vehicle comprising a gear segment rigidly attached to the subframe, a shaft extending transversely on the main frame with a worm adapted to mesh with said segment, a handle device provided for either end of the shaft at the outside of the frame, a bracket depending from the frame, a bearing yoke for the shaft hinged to the bracket to permit swinging the worm into and out of engagement with the segment, the hinge connection being located below the shaft axis so that said yoke normally tends to swing downwardly by gravity about said hinge for carrying the worm out of engagement with the segment, together with a rigid arm associated with said yoke, and locking means carried by the frame engageable with said arm at either limit of swing about the hinge for holding the parts positively in adjusted position.

7. In a trailer vehicle comprising a main frame, a subframe swivelly connected thereto, and wheels on the subframe adapted for steering movement by virtue of such swivel connection, manually operable steering connections accessible for manipulation at the side of the vehicle, comprising a gear segment attached to the subframe, a shaft extending transversely on the main frame with a worm adapted to mesh with said segment, a bearing yoke for the shaft hinged to the frame at a distance from the shaft axis, a slotted arm associated with said yoke, its slot having enlarged portions at the ends, a rod slidable transversely in the frame and accessible at the side of the frame, said rod passing through the slot and having a part which is too large to enter said slot except at its enlarged end portions, whereby said part serves to lock the yoke at one or the other of its limits of swing, and yieldable means associated with said rod for holding its larger part normally in engagement with the slot.

8. In a trailer vehicle comprising a main frame, a sub-frame swivelly connected thereto, and wheels on the sub-frame adapted for steering movement by virtue of such swivel connection, manually operable steering connections accessible for manipulation at the side of the vehicle, comprising a shaft extending transversely of the main frame, and cooperative gearing members including a gear segment attached to the sub-frame, and a worm on the shaft adapted to mesh with said gear segment, and means for shifting one of said gearing members out of operative engagement with the other.

LEROY E. WILLIAMS.